(12) United States Patent
Camardello et al.

(10) Patent No.: US 8,178,002 B2
(45) Date of Patent: May 15, 2012

(54) OXY-NITRIDE PYROSILICATE BASED PERSISTENT PHOSPHORS

(75) Inventors: Sam Joseph Camardello, Saratoga Springs, NY (US); Holly Ann Comanzo, Niskayuna, NY (US); Alok Mani Srivastava, Niskayuna, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/643,132

(22) Filed: Dec. 21, 2009

(65) Prior Publication Data

US 2011/0147660 A1 Jun. 23, 2011

(51) Int. Cl.
*C09K 11/54* (2006.01)
*C09K 11/66* (2006.01)
(52) U.S. Cl. ............... 252/301.6 F; 252/301.4 F
(58) Field of Classification Search ............ 252/301.4 F, 252/301.6 F, 301.4 R
See application file for complete search history.

(56) References Cited

U.S. PATENT DOCUMENTS

| | | | |
|---|---|---|---|
| 6,093,346 A | 7/2000 | Xiao et al. | |
| 6,190,577 B1 | 2/2001 | Hase et al. | |
| 7,229,571 B2 | 6/2007 | Ezuhara et al. | |
| 2005/0179008 A1 | 8/2005 | Xiao et al. | |
| 2006/0208270 A1* | 9/2006 | Chandran et al. | 257/100 |
| 2007/0045650 A1* | 3/2007 | Hancu et al. | 257/100 |
| 2007/0215837 A1* | 9/2007 | Chiruvolu et al. | 252/301.4 R |
| 2007/0296326 A1* | 12/2007 | Xiao et al. | 313/483 |
| 2009/0286014 A1 | 11/2009 | Scherer | |

FOREIGN PATENT DOCUMENTS

| | | |
|---|---|---|
| EP | 0972815 A1 | 1/2000 |
| WO | 2005103197 A1 | 11/2005 |

OTHER PUBLICATIONS

Weiyi Jia et al., "A blue persistent phosphor of alkali-earth silicate with a defective phase" Paper presented at the [207th ECS Meeting}, 2005: Abstract #1329, 1 page.
Huiming Ji et al. "A new phosphor with flower-like structure and luminescent properties of Sr2MgSi2O7: Eu2+, Dy3+ long afterglow materials by sol-gel method" Journal of Sol-Gel Science and Technology, 2007; 44(2): 133-137, 5 pages.
Yongchai Xu et al., "Combustion synthesis and photoluminescence of Sr2MgSi2O7:Eu,Dy long lasting phosphor nanoparticles" Ceramics International, 2008; 34(8): 2117-2120, 4 pages.

(Continued)

*Primary Examiner* — Jerry Lorengo
*Assistant Examiner* — Lynne Edmondson
(74) *Attorney, Agent, or Firm* — Cantor Colburn LLP

(57) ABSTRACT

A blue or yellow persistent phosphor composition is provided, along with methods for making and using the composition. In one embodiment, the phosphor comprises a formula of $A_{a-b-c}$-$B_d C_e (O_{f-g} N_g)$:$Eu_b$,-$RE_c$, wherein, A may be Sr, Ca, Ba, or a combination thereof; B may be Mg, Zn, Co, or a combination thereof; C may be Si, Ge, or a combination thereof; a is between 1 and 2.0; b is between 0.0005 and 0.1; c is between 0.0005 and 0.1; d is between 0.9 and 1; e is between 2 and 2.1; f is between 6 and 7; g is between 0.001 and 0.1; and RE is Dy, Nd, Er, Ho, Tm, Yb or a combination thereof. Embodiments use Sr, Mg and Si to produce blue phosphors or Ca, Mg and Si to produce yellow phosphors. In other embodiments, methods for making and applications for using, including uses in toys, emergency equipment, clothing, and instrument panels, are provided.

19 Claims, 1 Drawing Sheet

OTHER PUBLICATIONS

Yanqin Li et al., "Effects of non-stoichiometry on crystallinity, photoluminescence and afterglow properties of Sr2MgSi2O7:Eu2+,Dy3+ phosphors" Journal of Luminescence, 2009; 129(10): 1230-1234, 5 pages.

Wen Pan et al., "Enhanced luminescent properties of long-persistent Sr2MgSi2O7:Eu2+, Dy3+ phosphor prepared by the co-precipitation method" Journal of Luminescence, 2008; 128(12): 1975-1979, 5 pages.

Enhancement of long-persistence by Ce3+ co-doping in Sr2MgSi2O7:Eu2+, Dy3+ blue phosphor Journal of Physics: Conference Series, 2009; 152, 7 pages.

Xiaohong Tan "Fabrication and properties of Sr2MgSi2O7:Eu2+, Dy3+ nanostructures by an AAO template assisted co-deposition method" Journal of Alloys and Compounds, 2009; 477(1-2): 648-651, 4 pages.

Haoyi Wu et al. "Influence on luminescent properties of the Sr2MgSi2O7: Eu2+ by Dy3+, Nd3+ co-doping" Journal of Alloys and Compounds, 2009: 549-553, 5 pages.

Haoyi Wu et al., "Influence on the long afterglow properties by the environmental temperature" Journal of Luminescence 130, 2009; 127-130, 4 pages.

Mao Da-Li et al., "Long Lasting Behavior of Nano-sized Sr2MgSi2O7:Eu2+, Dy3+ Phosphor" Wuji Cailiao Xuebao/ Journal of Inorganic Materials, 2005; 20(1): 220-224, 5 pages.

Fei Qin et al. "Luminscent Properties of Sr2MgSi2O7 and Ca2MgSi2O7 long lasting phosphors activated by Eu2+, Dy3+" State Key Laboratory of Metal Matrix Composites, Shanghai Jiaotong University, 1954 Huashun Road, Shanghai 200030, PR China 5 Pages.

Qin Fei et al., "Luminescent properties of Sr2MgSi2O7 and Ca2MgSi2O7 long lasting phosphors activated by Eu2+, Dy3+" Journal of Alloys and Compounds, 2005; 390(1-2): 133-137, 5 pages.

Shigeki Shirakura et al., "Sol-Gel Synthesis of Long Persistent Phosphor Sr2MgSi2O7: Eu, Dy Thin film" Nippon Seramikkusu Kyokai Gakujutsu Ronbush~Journal of the Ceramic Society of Japan, 2005; 113(1319): 484-487, 4 pages.

International Search Report; International Application No. US2010058311; International Filing Date Nov. 30, 2010; Date of Mailing Feb. 25, 2011; 5 Pages.

Written Opinion of the International Searching Authority; International Application No. US2010058311; International Filing Date Nov. 30, 2010; Date of Mailing Feb. 25, 2011; 7 Pages.

Yuanhua Lin et al. "Preparation and characterization of long afterglow M2MgSi2O7-based (M: Ca, Sr, Ba) photoluminescent phosphors" Materials Chemistry and Physics, 2003; 82(3): 860-863, 4 pages.

A.A. Sabbagh Alvani et al., "Preparation and properties of long afterglow in alkaline earth silicate phosphors co-doped by Eu2O3 and Dy2O3" Journal of Luminescence, 2005; 115(3-4): 147-150, 4 pages.

Zhou Yong-quiang et al., "Preparation and Properties of Long Afterglow Luminescent Glass-ceramic" Guangzi Xuebao/ Acta Photonica Sinica, 2008; 37(Suppl): 188-190; 3 pages.

Zhai Yongqing et al., "Preparation and Properties of New Blue Long Afterglow Phosphor SrMgSi2O6:Eu2+,Dy3+" Kuei Suan Jen Hsueh Pao/Journal of the Chinese Ceramic Society, 2008; 36(12): 1758-1763, 6 pages.

Yuanhua Lin et al., "Preparation of a new long afterglow blue-emitting Sr2MgSi2O7-based photoluminescent phosphor" Journal of Materials Science Letters, 2001; 20(16): 1505-1506, 2 pages.

A.R. Mirhabibi et al., "Studies of luminescence property of long afterglow Eu2+, Dy3+ activated Sr2MgSi2O7 phosphor" Pigment and Resin Technology, 2004; 33(4): 220-225, 6 pages.

Geng Xiujuan et al. "Synthesis of Long Afterglow Photoluminescent Materials Sr2MgSi2O7: Eu2+, Dy3+by Sol-Gel Method" Journal of Rare Earths, 2005; 23(3): 292-294, 3 pages.

Yu-ichiro Imanari et al., "Synthesis of Phosphor Materials Using Natural Ore 'Serpentine'", Nippon Seramikkusu Kyokai Gakujutsu Ronbunshi/Journal of Ceramic Society of Japan, 2003; 111(1290): 151-154, 4 pages.

Takashi Nonogawa et al., "Synthesis of Phosphor Materials Using Silica Sand" Nippon Seramikltusu Kyokai Gakujutsu Ronbunshi/Journal of the Ceramic Society of Japan, 2005; 113(1318): 442-445.

Fenglan Song et al., "Synthesis of Sr2MgSi2O7:Eu, Dy and Sr2MgSi2O7:Eu, Dy. Nd by a modified solid-state reaction and their luminescent properties" Journal of Alloys and Compounds, 2008; 458(1-2): 564-568, 5 pages.

Jiang Hong-yi et al., "Synthesizing a Long Afterglow Luminescent Materials of Sr2MgSi2O7:Eu2+, Dy3+ by Sol-gel Methods" Wuhan Ligong Daxue Xuebao/Journal of Wuhan University of Technology, 2005; 27(7): 17-19.

Chaoshu Shi et al., "The roles of Eu2+ and Dy3+ in the blue long-lasting phosphor Sr2MgSi2O7:Eu2+, Dy3+" Journal of Luminescence, 2007; 122-123(1-2): 11-13, 3 pages.

Jiang Hong-yi et al., "The Synthesizing and Properties of Sr2MgSi2O7-based Long Afterglow Luminescent Materials" Wuhan Ligong Daxue Xuebao/Journal of Wuhan University of Technology, 2003; 25(11): [5-7] 3 pages.

Bo Liu et al., "The trap states in the Sr2MgSi2O7 and (Sr,Ca)MgSi2O7 long afterglow phosphor activated by Eu2+ and Dy3+" Journal of Alloys and Compounds, 2005; 387(1-2): 65-69, 5 pages.

Jiang Hong-yi et al., "Theoretic Calculation on the Electronic Structures of Sr2MgSi2O7 by B-doping" Wuhan Ligong Daxue Xuebao/ Journal of Wuhan University of Technology, 2008; 30(9): 5-8, 4 pages.

Bo Liu et al., "White-light long-lasting phosphor Sr2MgSi2O7:Dy3+", Journal of Luminescence, 2007; 122-123(1-2): 121-124, 4 pages.

Sabbagh Alvani et al., "X-ray Diffraction and SEM Studies on the Effect of Temperature on the Formation of Main Phase Sr2MgSi2O7 Using a Wet and Dry Method for its Preparation" Iranian Journal of Chemistry and Chemical Engineering, 2005; 24(4): 73-78, 6 pages.

International Publication No. 2005103197 (A); Publication Date: Nov. 3, 2005; Abstract Only; Database No. XP002623191; 1 Page.

* cited by examiner

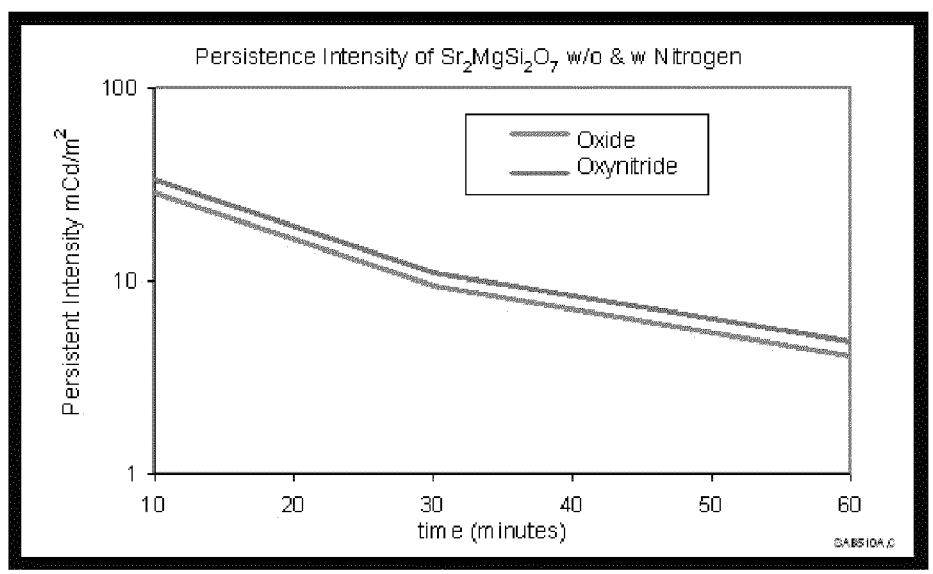

OXY-NITRIDE PYROSILICATE BASED PERSISTENT PHOSPHORS

FIELD OF THE INVENTION

The present invention relates to persistent phosphors having a long decay period, and in particular, to blue (Sr rich) to yellow (Ca rich) persistent phosphor compositions based on pyrosilicates wherein a small portion of the oxide component has been replaced by a nitride component, and techniques for the manufacture and use of such phosphors.

BACKGROUND OF THE INVENTION

A phosphor is a luminescent material that absorbs radiation energy in one portion of the electromagnetic spectrum and emits energy in another portion of the electromagnetic spectrum. One important class of phosphors includes crystalline inorganic compounds of very high chemical purity and of controlled composition, to which small quantities of other elements, called "activators," have been added for fluorescent emission. With the right combination of activators and inorganic compounds, the color of the emission of these crystalline phosphors can be controlled. Most useful and well-known phosphors emit radiation in the visible portion of the electromagnetic spectrum in response to excitation by electromagnetic energy outside the visible range. Well known phosphors have been used in mercury vapor discharge lamps to convert the ultraviolet (UV) radiation emitted by the excited mercury to visible light. Other phosphors are capable of emitting visible light upon being excited by electrons, useful in photomultiplier tubes, or X-rays, such as scintillators used in imaging systems.

One important property of phosphors is the decay time, e.g., the time required for the phosphor to stop emitting light after the excitation is removed. Most phosphor compositions have extremely short decay times, with most of the stored energy emitted as light within seconds, or even a small fraction of a second after excitation ends. These phosphors may be useful in lighting type applications where continuous excitation is present. However, in many applications it would be worthwhile to have a phosphorescent material that continues to emit light for long periods of time after excitation has ended.

Persistent phosphors based $Sr_2MgSi_2O_7$ host lattices and activated with $Eu^{2+}$ and $Dy^{3+}$ were developed to provide a blue persistent phosphor that has found wide application in both the aesthetic and functional markets, including, but not limited to entertainment, safety and emergency lighting and in exit signage. However, the applications of these materials are limited mainly due to their initial intensity and length of persistence as these pyrosilicate based materials have a relatively low initial intensity and decay relatively quickly.

Accordingly, it would be beneficial to provide a blue (Sr rich) to yellow (Ca rich) persistent phosphor having a higher initial intensity and slower rate of decay as compared to the prior art pyrosilicate based blue persistent phosphor materials. It would also be beneficial to provide methods of making these blue (Sr rich) to yellow (Ca rich) persistent phosphors as well as articles utilizing such persistent phosphors.

BRIEF SUMMARY OF THE INVENTION

The present invention provides blue (Sr rich) to yellow (Ca rich) persistent phosphor materials having a higher initial intensity, a slower rate of decay and/or longer length of persistence. These phosphors are based on pyrosilicates that have been activated by the addition of combinations of lanthanoid metals, such as, but not limited to, europium, dysprosium, and neodymium. These phosphors have a higher initial intensity, a slower rate of decay and/or longer length of persistence as compared to the prior art.

Accordingly, in one aspect, the present invention provides a material including a phosphor having a general formula of, $A_{a-b-c}B_dC_e(O_{f-g}N_g):Eu_b, RE_c$ wherein A may be Sr, Ca, Ba, or a combination thereof, B may be Mg, Zn, Co or a combination thereof, and C may be Si or Ge or a combination thereof; a is between 1 and 2.0; b is between 0.0005 and 0.1; c is between 0.0005 and 0.1; d is between 0.9 and 1; e is between 2 and 2.1; f is between 6 and 7; g is between 0.001 and 0.1; and RE is Dy, Nd, Er, Ho, Tm, Yb or a combination thereof.

In another aspect, the present invention provides a method for producing a phosphor, the method including the steps of providing amounts of an oxy-nitride-containing compounds of europium, RE, at least one alkaline-earth metal selected from the group consisting of Ba, Sr, Ca, and combinations thereof, at least one metal selected from the group consisting of Mg, Zn, Co and combinations thereof, and at least one metal selected from the group consisting of Si, Ge and combinations there of, wherein RE is at least one of neodymium or dysprosium Er, Ho, Tm, Yb; mixing together the oxy-nitride-containing compounds to form a mixture; and then firing the mixture at a temperature between about 900° C. and about 1700° C. under a reducing atmosphere for a sufficient period of time to convert the mixture to a phosphor having a general formula of, $A_{a-b-c}B_dC_e(O_{f-g}N_g):Eu_b, RE_c$ wherein A may be Sr, Ca, Ba, or a combination of these metals, B may be Mg, Zn, Co or a combination thereof, and C may be Si or Ge or a combination thereof; a is between 1 and 2.0; b is between 0.0005 and 0.1; c is between 0.0005 and 0.1; d is between 0.9 and 1; e is between 2 and 2.1; f is between 6 and 7; g is between 0.001 and 0.1; and RE is Dy, Nd, Er, Ho, Tm, Yb or a combination thereof.

In yet another aspect, the present invention provides an article of manufacture containing a phosphor, including a structure; and a phosphor having a general formula of $A_{a-b-c}B_dC_e(O_{f-g}N_g):Eu_b, RE_c$ wherein A may be Sr, Ca, Ba, or a combination of these metals, B may be Mg, Zn, Co or a combination thereof, and C may be Si or Ge or a combination thereof; a is between 1 and 2.0; b is between 0.0005 and 0.1; c is between 0.0005 and 0.1; d is between 0.9 and 1; e is between 2 and 2.1; f is between 6 and 7; g is between 0.001 and 0.1; and RE is Dy, Nd, Er, Ho, Tm, Yb or a combination thereof.

BRIEF DESCRIPTION OF THE DRAWINGS

These and other features, aspects, and advantages of the present techniques will become better understood when the following detailed description is read with reference to the accompanying drawings in which like characters represent like parts throughout the drawings, wherein:

FIG. 1 is a graphical representation of the persistent intensity for a blue persistent phosphor made in accordance with embodiments of the present techniques and compared to a prior art blue persistent phosphor.

DETAILED DESCRIPTION OF THE INVENTION

The present invention is more particularly described in the following description and example that are intended to be illustrative only since numerous modifications and variations therein will be apparent to those skilled in the art. As used in the specification and in the claims, the term "comprising"

may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention addresses the problems of prior art materials and provides blue persistent phosphor materials having a higher initial intensity, a slower rate of decay and/or longer length of persistence. These phosphors are based on oxy-nitrides of pyrosilicates activated by the addition of combinations of lanthanoid metals, such as europium, dysprosium, and neodymium, Er, Ho, Tm, Yb. For example, phosphors contained in embodiments of the present techniques may have a general formula of, $A_{a-b-c}B_dC_e(O_{f-g}N_g):Eu_b,RE_c$ wherein A may be Sr, Ca, Ba, or a combination of these metals, B may be Mg, Zn, Co or a combination thereof, and C may be Si or Ge or a combination thereof; a is between 1 and 2.0; b is between 0.0005 and 0.1; c is between 0.0005 and 0.1; d is between 0.9 and 1; e is between 2 and 2.1; f is between 6 and 7; g is between 0.001 and 0.1; and RE is Dy, Nd, Er, Ho, Tm, Yb or a combination thereof. Select embodiments utilize Mg, Si and either Sr or Ca, depending on the desired color. Phosphors made according to this formulation have a blue (Sr rich) or yellow (Ca rich) luminescence and a longer persistence than other types of phosphors.

The phosphors of the present invention are based on pyrosilicates wherein a small portion of the oxide component has been replaced by a nitride component. It has been found that these oxy-nitride embodiments provide better results than the oxide-based prior art phosphors. The amount of nitride substituted for oxide is relatively small, from 0.001 to 0.1 moles, but the use of the nitride helps provide a phosphor having a higher initial intensity, a slower rate of decay and/or longer length of persistence as compared to oxide-based prior art phosphors.

The phosphors of the present invention are activated as per prior art phosphor materials using one or more lanthanoid metals. In one embodiment, europium is used along with dysprosium as the lanthanoid metals.

The phosphors of the present invention may be made using various techniques. In one embodiment, they may be made into particles of about 1 to 20 microns, or larger, using standard firing techniques.

As may be seen in FIG. 1, which is described in greater detail in the accompanying examples, a comparison of the persistent intensity over time of one embodiment of an oxy-nitride based blue persistent phosphor as compared to prior art oxide-based blue persistent phosphors may be seen. In this FIGURE it can be seen that for the oxide-based materials, these materials have a lower initial intensity and have a slightly faster rate of decay in that intensity. The persistence of phosphors made in accordance with the present techniques may also be longer than previous phosphors. Again, as seen in FIG. 1, while the value of the emission intensity at 1 hour is weak as compared to the initial intensity, the remaining intensity may still be strong enough to still be seen by the human eye in a totally dark environment.

The persistent phosphors of the present techniques may be used in any number of applications requiring long term light in locations that have no energy source for powered lighting. In embodiments of the present techniques a plastic matrix may contain embedded particles of a persistent phosphor. In other embodiments, the phosphor particles may be incorporated into the plastic matrix of a film or surface layer attached to the body of a structure. In either of these embodiments, incorporation of the phosphor particles into the matrix or surface layer may be implemented using normal plastics processing techniques. Such techniques could include compression molding, injection molding, sheet forming, film blowing, or any other plastics processing technique that can incorporate a dry powder into a plastic matrix. One skilled in the art will recognize that the plastic matrix material used in these techniques may be any thermoplastic material with sufficient translucency to allow light transfer through thin layers, including, but not limited to, polystyrene, high impact polystyrene (HIPS), styrene-butadiene copolymers, polycarbonate, polyethylene, polyurethane, polyethylene terephthalate (PET), polyethylene terephthalate glycol (PETG), and polypropylene, among others. Furthermore, thermoset materials may also be used for the plastic matrix, including such compounds as silicon room temperature vulcanized (RTV) compounds and epoxies, among others. In embodiments, the phosphors are incorporated into the thermoset resins by mixing the phosphor with one of the two reactant portions. Further, the matrix does not need to be plastic. One of ordinary skill in the art will recognize that the phosphors of the present techniques may be incorporated into glass or ceramic matrices as well.

Particles of the phosphor may lack compatibility with the matrix leading to agglomeration during processing. This effect may be especially severe for smaller particles, such as nano-scale particles. For both types of phosphor particles, this effect may be lessened by coating the particles prior to incorporation in the matrix. The coating may include either small molecule ligands or polymeric ligands. Exemplary small molecule ligands may include octyl amine, oleic acid, trioctylphosphine oxide, or trialkoxysilane. Those skilled in the art will realize that other small molecule ligands may be used in addition to, or in place of, those listed here. The particles may also be coated with polymeric ligands, which may be either synthesized from the surface of the particles or added to the surface of the nano-scale particles.

In one embodiment, a particle is coated by growing polymer chains from the surface of the particle. In this embodiment, the particle may be functionalized by the addition of polymer initiation compounds to form polymer initiation sites on the particle. In certain embodiments, such polymer initiation compounds may include amines, carboxylic acids, or alkoxy silanes, among others. Those skilled in the art will recognize that other polymer initiation compounds may work in addition to, or in place of, those listed here. Once the particle has been functionalized with the initiation compounds, monomers may be added to the solution to grow polymeric or oligomeric chains from the initiation sites. The final size of the shell that is formed around the particle will depend on the number of initiation sites and the amount of monomer added to the solution. Those skilled in the art will recognize that these parameters may be adjusted for the results selected.

In an alternative embodiment, a particle is coated with a polymer. In this embodiment, the polymer chain may be chosen to interact with the particle, and may include random copolymers and block copolymers. In the latter embodiment, one monomer chain may be chosen to interact with the particle, while the other may be chosen to interact with the matrix. In certain embodiments, the polymer coating may include such groups as amines, carboxylic acids, and alkoxy silanes, among others. One of ordinary skill in the art will recognize that other functional groups may also be effective.

Fixing mixtures of precursor powders under a reducing atmosphere may produce the persistent phosphors of the present invention in various manners. In one embodiment, the persistent phosphors may be produced by mixing powders or co-precipitated mixtures of oxygen-containing compounds of europium, neodymium, dysprosium Er, Ho, Tm, and/or Yb, an alkaline-earth metal, one or more group 13 elements, nitrogen-containing compounds and other metal oxygen-containing compounds, in accordance with the formulations shown above, and then firing the mixture under a reducing atmosphere. The oxygen-containing compounds may be but are not limited to, oxides, carbonates, nitrates, citrates, carboxylates, or combinations of these compounds. The nitrogen-containing compounds are solid nitrides.

In other embodiments, the mixture of starting materials for producing the phosphor may also include a flux. The flux, for example, may include materials such as, but not limited to, boric acid, lithium tetraborate, lithium carbonate, hydrogen borate, boron oxide, or a mixture of these compounds.

The oxygen-containing compounds and the nitrogen-containing compounds may be mixed together by any appropriate mechanical method or chemical method. In one embodiment, such methods may include stirring or blending the powders in a high-speed blender, ball mill or a ribbon blender. Those skilled in the art will recognize that any number of other techniques may be used to make a well-blended mixture of powders.

The mixture of oxide powders and nitride powders may be fired in a reducing atmosphere at a temperature in a range from about 900° C. to about 1,700° C. for a time sufficient to convert the mixture to the phosphor. In one embodiment the temperature may be in the range from about 1,000° C. to about 1,400° C. The firing may be conducted in a batch or continuous process, beneficially with stirring or mixing to promote good gas-solid contact. The firing time required may range from about one minute to ten hours, depending on the amount of the mixture being fired, the extent of contact between the solid and the gas of the atmosphere, and the degree of mixing while the mixture is fired or heated. The mixture may rapidly be brought to and held at the final temperature, or the mixture may be heated to the final temperature at a lower rate such as from about 1° C./minute to about 200° C./minute. In select embodiments, the temperature is raised to the final temperature at rates of about 3° C./minute to about 25° C./minute.

The firing is performed under a reducing atmosphere, which may include such compounds as hydrogen, carbon monoxide, ammonia, or a mixture of these compounds with an inert gas such as nitrogen, helium, argon, krypton, xenon, or a mixture thereof. In one embodiment, a mixture of hydrogen and nitrogen containing hydrogen in an amount from about 0.1 volume percent to about 10 volume percent may be used as a reducing gas. In another embodiment, the reducing gas may be carbon monoxide, generated in situ in the firing chamber by the reaction between residual oxygen and carbon particles placed in the firing chamber. In yet another embodiment, the reducing atmosphere is generated by the decomposition of ammonia or hydrazine.

The fired phosphor may be milled to form smaller particles and break up aggregates. The final phosphor may then be incorporated into the matrix to form the final product.

The phosphors of the present invention may be incorporated into numerous products used in low light applications. Such applications include, but are not limited to, cell phones and keyboards, such as in the keypad, front faceplate or in the controls attached to the faceplate. Additionally, the low toxicity of the phosphors of the present techniques makes applications such as toys and other commercial or consumer goods a possibility.

Furthermore, the long persistence of the phosphors of the present techniques makes them useful for applications in emergency equipment. Examples of such equipment include, but are not limited to, hard hats, stickers or decals applied to safety equipment, emergency exit signs, such as lettering or the sign itself, articles of clothing, such as in the fabric or in lettering or symbols applied to the clothing, and the like. In alternative embodiment, the phosphors may be included in lettering, such as an "EXIT" sign and may either be colored, so as to be visible at all times, or clear, so as to be visible only in low light conditions, when the glow from the incorporated phosphors may be visible.

The applications above are but a few examples of embodiments of the present techniques and are not intended to limit its application to those uses. Those skilled in the art will recognize that a long-lived persistent phosphor may be useful in a large variety of applications beyond the ones listed above.

The present invention is further illustrated by the following non-limiting examples.

EXAMPLES

The present invention will now be illustrated in more detail by reference to the following specific, non-limiting examples. Unless otherwise indicated, all percentages are by weight.

In this example, 19.69 g of $SrCO_3$, 0.075 g of $Eu_2O_3$, 0.24 g of $Dy_2O_3$, 2.72 g of MgO, 8.07 g of $SiO_2$ and 0.12 g of $Si_3N_4$ were blended together to form a blue persistent phosphor according to one embodiment of the present invention. The intimate mixture of the aforementioned starting raw materials was placed in an alumina tray and heated to a temperature of 1350 deg C. for a period of five hours in 1% forming gas.

Upon completion of the firing, the phosphor was obtained in the form of a sintered cake. This cake was reduced to a powder using a ball mill until the mean particle size (d50) reached the desired size. The resultant phosphor exhibited an improved initial intensity and long persistence as compared to standard silicate analog. The oxy-nitride phosphor persistence was measured relative to the standard silicate phosphor. The results of the optical measurements are shown in Table 1 and graphically in FIG. 1.

TABLE 1

| PERSISTENT EFFICIENCY OF $Sr_2MgSi_2O_7$ and $Sr_2MgSi_2(O,N)_7$ PHOSPHOR | | | | | | | | |
|---|---|---|---|---|---|---|---|---|
| Time (min) | 1 | 2 | 5 | 10 | 30 | 60 | 180 | 300 |
| Silicate | 1 | 1 | 1 | 1 | 1 | 1 | 1 | 1 |
| Oxy-nitride | 1.13 | 1.14 | 1.15 | 1.16 | 1.17 | 1.19 | 1.23 | 1.23 |

% relative to standard intensity wrt time (minutes)

Table 1 shows that phosphors produced with the oxy-nitride composition have an initial intensity and persistent emission exceeding that of the standard silicate sample as well as a slightly lower rate of decay. As such, the initial efficiency of the resultant phosphor exceeds that of the standard composition. In addition, the persistent intensity also exceeds that of the standard composition.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

The invention claimed is:

1. A material comprising a phosphor comprising a general formula of:

$$A_{a-b-c}B_dC_e(O_{f-g}N_g):Eu_b,RE_c,$$

wherein:
A comprises Sr, Ca, Ba, or a combination of these metals;
B comprises Mg, Zn, Co, or a combination thereof;
C comprises Si, Ge, or a combination thereof;
a is between 1 and 2.0;
b is between 0.0005 and 0.1;
c is between 0.0005 and 0.1;
d is between 0.9 and 1;
e is between 2 and 2.1;
f is between 6 and 7;
g is between 0.001 and 0.1; and
RE is Dy, Nd, Er, Ho, Tm, Yb or a combination thereof.

2. The material of claim 1, wherein A is Sr, B is Mg and C is Si.

3. The material of claim 1, wherein A is Ca, B is Mg and C is Si.

4. The material of claim 1, wherein the phosphor has the formula:

$$(Sr_{1.975}Eu_{0.0063}Dy_{0.0187})MgSi_{2.025}O_{6.95}N_{0.05}.$$

5. A method for producing a phosphor, the method comprising:
providing amounts of nitrogen-containing compounds, oxygen-containing compounds of europium, RE, or a co-precipated mixture of oxygen-containing compounds, at least one alkaline-earth metal selected from the group consisting of Ba, Sr, Ca, and combinations thereof, at least one metal selected from the group consisting of Mg, Zn, Co and combinations thereof, and at least one metal selected from the group consisting of Si, Ge and combinations there of, wherein RE is at least one of neodymium or dysprosium Er, Ho, Tm, Yb;
mixing together the compounds to form a mixture; and then firing the mixture at a temperature between about 900° C. and about 1700° C. under a reducing atmosphere for a sufficient period of time to convert the mixture to a phosphor comprising a general formula of:

$$A_{a-b-c}B_dC_e(O_{f-g}N_g):Eu_b,RE_c,$$

wherein:
A comprises Sr, Ca, Ba, or a combination of these metals;
B comprises Mg, Zn, Co, or a combination thereof;
C comprises Si, Ge, or a combination thereof;
a is between 1 and 2.0;
b is between 0.0005 and 0.1;
c is between 0.0005 and 0.1;
d is between 0.9 and 1;
e is between 2 and 2.1;
f is between 6 and 7;
g is between 0.001 and 0.1; and
RE is Dy, Nd, Er, Ho, Tm, Yb or a combination thereof.

6. The method according to claim 5, wherein the oxygen-containing compounds are selected from the group consisting of oxides, carbonates, citrates, carboxylates, and combinations thereof.

7. The method according to claim 5, wherein the nitrogen-containing compounds comprises a solid nitride.

8. The method of claim 5, wherein A is Sr, B is Mg and C is Si.

9. The method of claim 5, wherein A is Ca, B is Mg and C is Si.

10. An article of manufacture containing a phosphor, comprising:
a structure comprising a phosphor, wherein the phosphor has a general formula of:

$$A_{a-b-c}B_dC_e(O_{f-g}N_g):Eu_b,RE_c,$$

wherein:
A comprises Sr, Ca, Ba, or a combination of these metals;
B comprises Mg, Zn, Co, or a combination thereof;
C comprises Si, Ge, or a combination thereof;
a is between 1 and 2.0;
b is between 0.0005 and 0.1;
c is between 0.0005 and 0.1;
d is between 0.9 and 1;
e is between 2 and 2.1;
f is between 6 and 7;
g is between 0.001 and 0.1; and
RE is Dy, Nd, Er, Ho, Tm, Yb or a combination thereof.

11. The article of manufacture of claim 10, wherein the structure is selected from the group consisting of safety equipment, toys, input devices, signs, emergency exit indicators, instrument panel controls, electrical switches, circuit breaker switches, furniture, communication devices, wristwatch faces, cell phones, keyboards, numbers on a wristwatch face, clock faces, numbers on a clock face, kitchen ware, utensils, labels, car dashboard controls, stair treads, clothing, lamps, weapon sights, and displays.

12. The article of manufacture of claim 10, wherein the phosphor is incorporated into the material of the structure.

13. The article of manufacture of claim 10, wherein the phosphor is incorporated into a film attached to the structure.

14. The article of manufacture of claim 10, wherein the phosphor is incorporated into a paint composition applied to the structure.

15. The article of manufacture of claim 10, wherein the structure comprises a thermo-plastic matrix selected from the group consisting of polystyrene, high impact polystyrene (HIPS), styrene-butadiene copolymer, polycarbonate, polyethylene, polyurethane, polyethylene terephthalate (PET), polyethylene terephthalate glycol (PETG), polypropylene, and combinations thereof.

16. The article of manufacture of claim 10, wherein the structure comprises a thermo-set plastic matrix selected from the group consisting of silicone RTV resin, epoxy resin, polyester, phenol-formaldehyde resin, melamine, and combinations thereof.

17. The article of manufacture of claim 10, wherein the structure comprises a glass, a ceramic, or a combination thereof.

18. An article of manufacture made from method for producing a phosphor of claim 5, wherein A is Sr, B is Mg and C is Si.

19. An article of manufacture made from method for producing a phosphor of claim 5, wherein A is Ca, B is Mg and C is Si.

* * * * *